A. TEAGUE.
Plow.

No. 2,998.

Patented Mar. 10, 1843.

UNITED STATES PATENT OFFICE.

ABNER TEAGUE, OF JACKSON, TENNESSEE.

IMPROVEMENT IN PLOWS.

Specification forming part of Letters Patent No. 2,998, dated March 10, 1843.

*To all whom it may concern:*

Be it known that I, ABNER TEAGUE, of Jackson, in the county of Madison and State of Tennessee, have invented a new and useful Improvement in Plows; and I do hereby declare that the following is a full, clear, and exact description thereof, reference being had to the accompanying drawings, making a part of this specification, in which—

Figure 1:
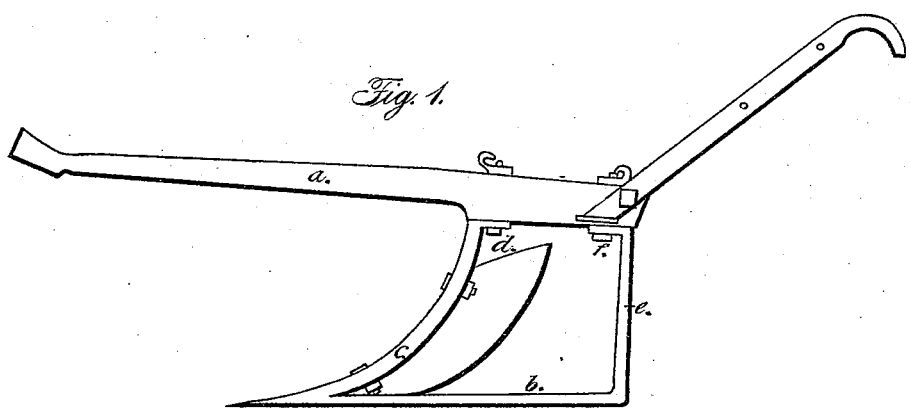
Figure 2:
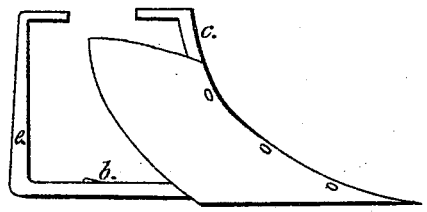

Figure 1 is a geometrical projection of the landside; Fig. 2, the mold-board.

In constructing my plow a beam, $a$, is formed similar to those of common plows at the forward end. From the colter back the beam is enlarged.

The landside is a straight bar of iron, $b$, from the front end of which a standard, $c$, curves up and backward in the form of the front edge of mold-board. The landside and front standard are drawn out at their junction into a point that runs forward under the mold-board, hereinafter described. The upper end of the standard $c$ is bent back horizontally far enough to receive a bolt, $d$, that passes up through it and the beam, and firmly connects them. At the heel of the landside a perpendicular standard, $e$, is attached, the upper end of which is turned horizontally forward under the beam, and is also attached to it by a bolt, $f$, similar to the forward standard.

The mold-board is affixed to the front standard by flat-headed screw-bolts, having nuts on them behind the standard. This mode of attachment gives great facility in shifting the mold-board, which may be formed of a single plate of iron, so formed as to present a cutting edge and point at the bottom, thus superseding the necessity of a separate share.

The handles are of the usual form and are affixed to the sides of the beam. The ends are confined by staples driven into the lower edge of the beam, and near the upper edge a bolt passes through them all, thus securing them together.

What I claim as my invention, and desire to secure by Letters Patent, is—

The combination of the standards $e$ and $c$ with the landside, all formed of a single bar of iron, constructed and arranged as above specified.

ABNER TEAGUE.

Witnesses:
 THOS. CONNSALLY,
 STEPHEN LYPERT.